(12) United States Patent
Huang et al.

(10) Patent No.: US 11,353,870 B2
(45) Date of Patent: Jun. 7, 2022

(54) AUTONOMOUS DRIVING COMPUTING AND STORAGE EXPANSION DEVICE WITH FLEXIBLE HOST AND CLIENT CONFIGURATION

(71) Applicant: Baidu USA LLC, Sunnyvale, CA (US)

(72) Inventors: Davy Huang, Sunnyvale, CA (US); Ji Li, Sunnyvale, CA (US); Manjiang Zhang, Sunnyvale, CA (US); Ran Zhang, Sunnyvale, CA (US); Youling Zou, Sunnyvale, CA (US); Xu Zhou, Sunnyvale, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 212 days.

(21) Appl. No.: 16/237,192

(22) Filed: Dec. 31, 2018

(65) Prior Publication Data

US 2020/0209856 A1 Jul. 2, 2020

(51) Int. Cl.
*G05D 1/00* (2006.01)
*B60R 16/023* (2006.01)
*H04L 12/40* (2006.01)

(52) U.S. Cl.
CPC ....... *G05D 1/0088* (2013.01); *B60R 16/0231* (2013.01); *H04L 12/40195* (2013.01);
(Continued)

(58) Field of Classification Search
CPC .......................... G05D 1/0088; B60R 16/0231
See application file for complete search history.

(56) References Cited

U.S. PATENT DOCUMENTS 8,849,494 B1 * 9/2014 Herbach ........... B60W 60/0015
701/24
9,434,267 B2 * 9/2016 Wang ..................... B64D 27/24
(Continued)

FOREIGN PATENT DOCUMENTS

CN 109062833 A 12/2018
JP 2007316859 A 12/2007

OTHER PUBLICATIONS

Mayhew, D. et al., PCI express and advanced switching: evolutionary path to building next generation interconnects, Published in: 11th Symposium on High Performance Interconnects, 2003. Proceedings. Date of Conference: Aug. 20-22, 2003 Date Added to IEEEXplore: Sep. 15, 2003 Print ISBN: 0-7695-201.*
(Continued)

*Primary Examiner* — Jean Paul Cass
(74) *Attorney, Agent, or Firm* — Womble Bond Dickinson (US) LLP

(57) ABSTRACT

A data processing system includes a host system and one or more expansion devices coupled to the host system over a bus. The host system may include one or more processors and a memory storing instructions, which when executed, cause the processors to perform autonomous driving operations to drive an autonomous driving vehicle (ADV). Each expansion device includes a switch device and one or more processing modules coupled to the switch device. Each processing module can be configured to perform at least one of the autonomous driving operations offloaded from the host system. At least one of the processing modules can be configured as a client node to perform an action in response to an instruction received from the host system. Alternatively, it can be configured as a host node to distribute a task to another client node within the expansion device. This host
(Continued)

node in the expansion device can further cooperate with the host system via a host-to-host connection.

20 Claims, 11 Drawing Sheets

(52) U.S. Cl.
CPC .............. *G05D 2201/0213* (2013.01); *H04L 2012/40273* (2013.01)

(56) References Cited

U.S. PATENT DOCUMENTS

| | | | | |
|---|---|---|---|---|
| 9,494,439 | B1* | 11/2016 | Ross | G05D 1/0022 |
| 9,632,502 | B1* | 4/2017 | Levinson | G01S 17/87 |
| 9,714,012 | B1* | 7/2017 | Hoareau | H01M 10/425 |
| 9,751,476 | B2* | 9/2017 | Kraft | G06F 13/409 |
| 9,764,703 | B2* | 9/2017 | Hoareau | B60L 50/00 |
| 9,815,633 | B1* | 11/2017 | Kisser | B25J 9/0093 |
| 9,950,814 | B1* | 4/2018 | Beckman | B61L 15/0027 |
| 10,023,309 | B2* | 7/2018 | Brown | B64D 47/06 |
| 10,108,850 | B1* | 10/2018 | Das | G06K 9/00885 |
| 10,195,952 | B2* | 2/2019 | Wang | B60L 53/126 |
| 10,332,405 | B2* | 6/2019 | Kopardekar | G08G 5/006 |
| 10,363,826 | B2* | 7/2019 | Wang | B64F 1/20 |
| 10,369,892 | B2* | 8/2019 | Cordes | B60L 53/34 |
| 10,369,893 | B2* | 8/2019 | Moghe | G05D 1/0212 |
| 10,384,692 | B2* | 8/2019 | Beckman | G06Q 30/0205 |
| 10,421,542 | B2* | 9/2019 | Beckman | B61D 3/16 |
| 10,452,068 | B2* | 10/2019 | Djuric | G06N 3/04 |
| 10,453,348 | B2* | 10/2019 | Speasl | B64F 1/222 |
| 10,467,685 | B1* | 11/2019 | Brisson | B64F 1/222 |
| 10,474,162 | B2* | 11/2019 | Browning | G06T 7/70 |
| 10,493,863 | B1* | 12/2019 | Thrun | B64C 39/026 |
| 10,499,446 | B1* | 12/2019 | Dowlatkhah | H04W 24/02 |
| 10,508,756 | B1* | 12/2019 | Sagnella | E04H 15/62 |
| 10,532,815 | B1* | 1/2020 | Thrun | H01M 10/441 |
| 10,600,322 | B2* | 3/2020 | Hosokawa | G06F 16/489 |
| 10,614,515 | B1* | 4/2020 | Brisson | G06Q 20/405 |
| 10,620,011 | B2* | 4/2020 | Cheaz | G06Q 10/083 |
| 10,627,825 | B2* | 4/2020 | Gutmann | B60W 30/08 |
| 10,640,111 | B1* | 5/2020 | Gutmann | B60W 30/143 |
| 10,661,896 | B2* | 5/2020 | Ozaki | B64C 39/02 |
| 10,662,696 | B2* | 5/2020 | Bradley | G06Q 10/08 |
| 10,678,240 | B2* | 6/2020 | Pollach | G06N 20/00 |
| 10,679,312 | B2* | 6/2020 | Matthiesen | G06Q 10/06315 |
| 10,684,361 | B2* | 6/2020 | Valois | G05D 1/021 |
| 10,694,331 | B1* | 6/2020 | Brooks Powell | H04W 4/023 |
| 10,703,480 | B1* | 7/2020 | Thrun | B64D 5/00 |
| 10,710,633 | B2* | 7/2020 | Carlson | G05D 1/0234 |
| 10,712,160 | B2* | 7/2020 | Rander | B60W 30/18172 |
| 10,712,742 | B2* | 7/2020 | Valois | G01S 13/931 |
| 10,712,750 | B2* | 7/2020 | Kentley-Klay | G07C 5/00 |
| 10,899,473 | B2* | 1/2021 | Scherz | B64C 39/024 |
| 10,953,754 | B1* | 3/2021 | Wiegman | B60L 50/50 |
| 10,974,911 | B2* | 4/2021 | Zevenbergen | B65G 47/92 |
| 2014/0032034 | A1* | 1/2014 | Raptopoulos | G05D 1/0088 701/25 |
| 2014/0070767 | A1* | 3/2014 | Morris | B60L 53/16 320/109 |
| 2014/0082238 | A1* | 3/2014 | Ahmad | G06F 13/42 710/110 |
| 2015/0142211 | A1* | 5/2015 | Shehata | H04W 4/42 701/2 |
| 2016/0012465 | A1* | 1/2016 | Sharp | G06Q 20/386 705/14.17 |
| 2016/0142211 | A1* | 5/2016 | Metke | H04L 9/3263 713/175 |
| 2016/0200421 | A1* | 7/2016 | Morrison | G05D 1/0077 244/17.23 |
| 2017/0295458 | A1* | 10/2017 | Gao | H04B 17/318 |
| 2017/0323572 | A1* | 11/2017 | Chan | G08G 5/0082 |
| 2017/0344023 | A1* | 11/2017 | Laubinger | B60W 50/14 |
| 2018/0238698 | A1* | 8/2018 | Pedersen | G01C 21/3469 |
| 2018/0285734 | A1* | 10/2018 | Chen | G06N 3/0454 |
| 2018/0293102 | A1* | 10/2018 | Ray | G06T 1/20 |
| 2018/0293490 | A1* | 10/2018 | Ma | G06N 3/0445 |
| 2018/0293491 | A1* | 10/2018 | Ma | G06N 3/08 |
| 2018/0293691 | A1* | 10/2018 | Nurvitadhi | G06F 9/4881 |
| 2018/0308201 | A1* | 10/2018 | Appu | G09G 5/363 |
| 2018/0308203 | A1* | 10/2018 | Appu | G06F 9/544 |
| 2018/0308206 | A1* | 10/2018 | Surti | G09G 5/363 |
| 2018/0308256 | A1* | 10/2018 | Appu | G06N 3/063 |
| 2018/0314250 | A1* | 11/2018 | Lewis | B60W 30/095 |
| 2018/0314521 | A1* | 11/2018 | Chen | G06N 3/063 |
| 2018/0335777 | A1* | 11/2018 | Gibbs | G05D 1/0297 |
| 2019/0047579 | A1* | 2/2019 | Fahim | B60W 50/0098 |
| 2019/0205745 | A1* | 7/2019 | Sridharan | G06F 9/5061 |
| 2019/0217735 | A1* | 7/2019 | Donnelly | B60W 20/13 |
| 2019/0303822 | A1* | 10/2019 | Spoon | G06Q 10/0635 |
| 2019/0324600 | A1* | 10/2019 | Wipperfurth | G01C 21/3667 |
| 2019/0329877 | A1* | 10/2019 | Benson | B64C 11/28 |
| 2019/0366989 | A1* | 12/2019 | James | B60T 7/20 |
| 2019/0381860 | A1* | 12/2019 | Credo | B60H 1/00785 |
| 2019/0381903 | A1* | 12/2019 | Shin | G06Q 20/145 |
| 2020/0009982 | A1* | 1/2020 | Kim | B60L 53/62 |
| 2020/0012531 | A1* | 1/2020 | Li | G06F 9/546 |
| 2020/0201328 | A1* | 6/2020 | Abramson | G05D 1/0214 |
| 2020/0209856 | A1* | 7/2020 | Huang | H04L 12/40195 |
| 2020/0211265 | A1* | 7/2020 | Brownlee | G06T 15/06 |
| 2020/0269835 | A1* | 8/2020 | Hara | G08G 1/005 |
| 2020/0301445 | A1* | 9/2020 | Jourdan | B64C 29/0025 |
| 2020/0317078 | A1* | 10/2020 | Zhang | B60L 58/12 |
| 2021/0081624 | A1* | 3/2021 | Kovarik | G06K 7/10376 |
| 2021/0129697 | A1* | 5/2021 | Cho | H04W 4/44 |

OTHER PUBLICATIONS

Hisa Ando, "Technology That Supports GPUs Massively Parallel Hardware Breakthrough" [Technical Basics], Gijutsu-Hyoronsha Co., Ltd., Jul. 13, 2017, 1st edition, pp. 237-262.

* cited by examiner

AUTONOMOUS DRIVING COMPUTING AND STORAGE EXPANSION DEVICE WITH FLEXIBLE HOST AND CLIENT CONFIGURATION

TECHNICAL FIELD

Embodiments of the present disclosure relate generally to data processing systems. More particularly, embodiments of the disclosure relate to computing and storage expansion devices having flexible host and client configuration for autonomous driving vehicles.

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

Autonomous driving development requires scalable and dynamic configurable hardware computation and storage resources in the system. In addition, host and client configuration and data flow can be different when targeting various functions and performance goals and architectures. A traditional method is to build an expansion device with connections to a main system and added computation and/or storage devices. Such a method usually appoints the main system to be the host, and expansion devices are all clients, or requiring multiple different hardware devices to build a system satisfying different requirements.

BRIEF DESCRIPTION OF THE DRAWINGS

Embodiments of the disclosure are illustrated by way of example and not limitation in the figures of the accompanying drawings in which like references indicate similar elements.

DETAILED DESCRIPTION

Figure 1:
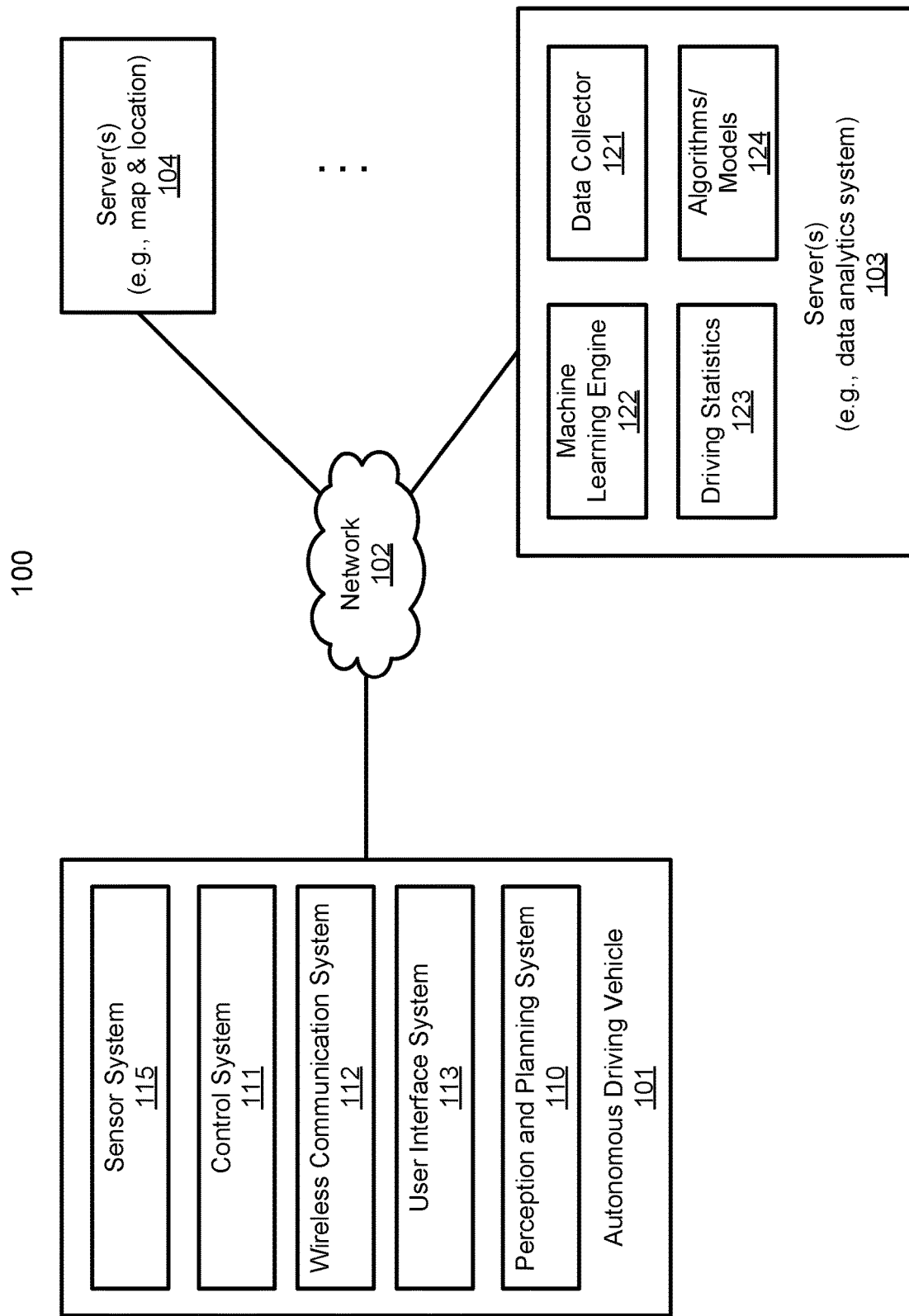
FIG. 1 is a block diagram illustrating a networked system according to one embodiment.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

According to some embodiments, a compute and storage expansion device, for example, as a part of autonomous driving system, is utilized to enable a flexible host and client configuration to function as a client device, a host device, or both. Such an expansion device can work as a client device supplement to a main system or work as a full system containing both host and client devices, and is able to perform host to host communication with another full system. Such changes only require firmware update but works on the same hardware implementation, i.e., without having to modify the hardware. All computation and storage modules are coupled to a switch device via various input and output (10) bus protocols, such as PCIe and Ethernet protocols. Such a switch device enables communications among the computation and storage modules, as well as communications with a main or host system external to the expansion device.

According to one aspect of the disclosure, a data processing system, which may be utilized in an autonomous driving vehicle (ADV), includes a host system and one or more expansion devices coupled to the host system over a bus. The host system may be a part of a perception and planning system of an ADV. The host system may include one or more processors and a memory storing instructions, which when executed, cause the processors to perform autonomous driving operations to drive the ADV. Each expansion device includes a switch device and one or more processing modules coupled to the switch device. Each processing module can be configured to perform at least one of the autonomous driving operations offloaded from the host system. At least one of the processing modules can be configured as a client node to perform an action in response to an instruction received from the host system. Alternatively, it can be configured as a host node to distribute a task to another client node within the expansion device.

In one embodiment, during the initialization of the expansion device, the firmware of the expansion device is configured to scan and detect that the host system is coupled to the expansion device. In response to such detection, the firmware configures at least one of the processing modules of the expansion device as a client device to the host system. In such a situation, the host system can offload at least one of the autonomous driving operations (e.g., perception, prediction, decision, and/or planning processes) to the processing modules that have been configured as a client device. In configuring a processing module as a client device to the host system, the firmware responds to a bus enumeration process initiated from the host system (e.g., by assigning an appropriate bus number and a device number, in the PCI configuration registers), such that the processing module appears a client device to the host system.

If the host system is not detected, according to one embodiment, the firmware of the expansion device selects and configures at least one of the processing modules as a host node or host processing module, while the remaining processing modules are configured as a client device to the host node. In this situation, the expansion device operates as a standalone system or a peer system with respect to the external host system. According to another embodiment, a first portion of the processing modules is configured as client nodes to the host system external to the expansion device. A second portion of the processing modules is configured as a separate system, which includes at least one host node and one or more client nodes. The external host system (together with the first portion of processing modules of the expansion device) and the second portion of processing modules of the expansion device operate as peer data processing systems.

According to another embodiment, a processing module of the expansion can be configured as a client node to the external host system, while it is also configured a host node with respect to another processing module within the expansion device. In response to data received from the host system, the processing module performs a data processing operation on the data (e.g., compression, encryption, data mining) as a client node to the host system. Thereafter, the processing module, now operating as a host node, distributes the processed data to another processing module (e.g., a storage module) of the expansion device to perform another action on the data (e.g., storing the data in a storage device of the expansion device), either via routing via the switch device using a bus protocol or via a peer to peer transaction (e.g., direct memory access or DMA transaction).

According to another aspect of the disclosure, an expansion device, which can be used to offload data processing operations from an external host system, includes a host interface capable of being coupled to an external host system, a switch device, and one or more processing modules coupled to the switch device. The host system may be a perception and planning system to autonomously drive an ADV. The host system may include one or more host processors and a memory storing instructions, which when executed by the host processors, cause the processors to perform autonomous driving operations. At least one of the processing modules can be configured as a client device to perform at least one of the autonomous driving operations offloaded from the host system. At least one of the processing modules can be configured as a host device to distribute tasks to other processing modules configured as client devices. The expansion device may further include the features or components described above.

FIG. 1 is a block diagram illustrating an autonomous vehicle network configuration according to one embodiment of the disclosure. Referring to FIG. 1, network configuration 100 includes autonomous vehicle 101 that may be communicatively coupled to one or more servers 103-104 over a network 102. Although there is one autonomous vehicle shown, multiple autonomous vehicles can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) servers, or location servers, etc.

An autonomous vehicle refers to a vehicle that can be configured to in an autonomous mode in which the vehicle navigates through an environment with little or no input from a driver. Such an autonomous vehicle can include a sensor system having one or more sensors that are configured to detect information about the environment in which the vehicle operates. The vehicle and its associated controller(s) use the detected information to navigate through the environment. Autonomous vehicle 101 can operate in a manual mode, a full autonomous mode, or a partial autonomous mode.

In one embodiment, autonomous vehicle 101 includes, but is not limited to, perception and planning system 110, vehicle control system 111, wireless communication system 112, user interface system 113, infotainment system 114, and sensor system 115. Autonomous vehicle 101 may further include certain common components included in ordinary vehicles, such as, an engine, wheels, steering wheel, transmission, etc., which may be controlled by vehicle control system 111 and/or perception and planning system 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
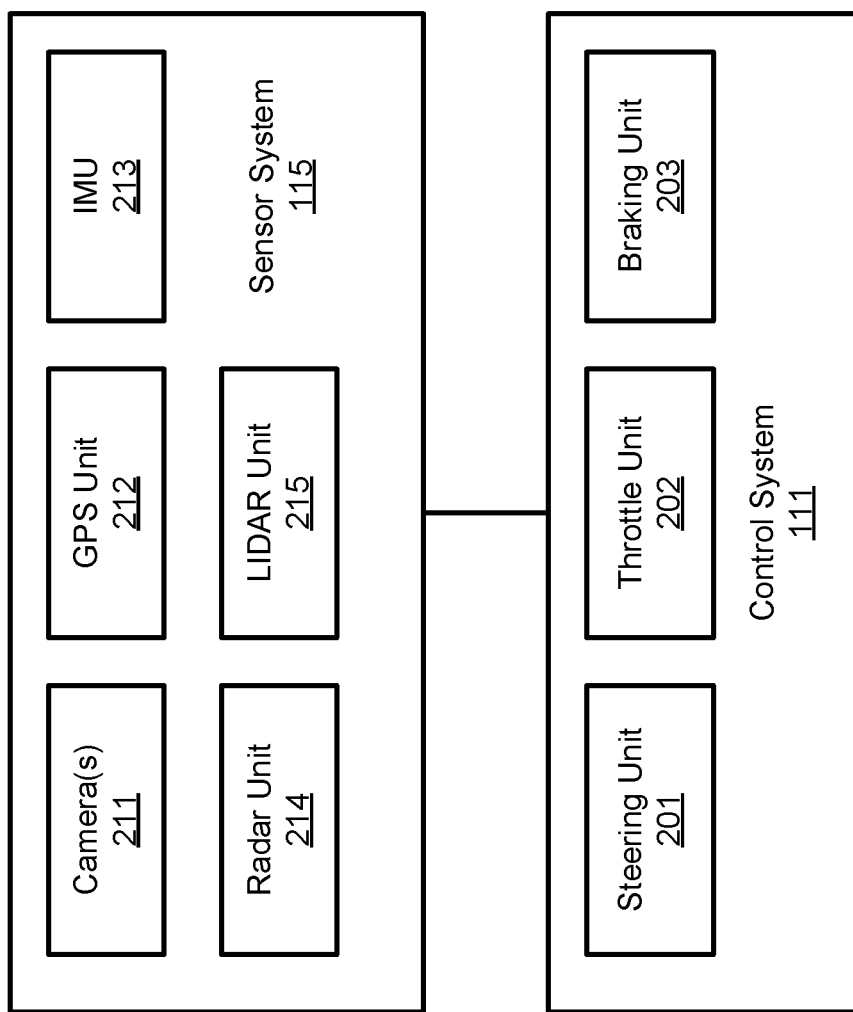
FIG. 2 is a block diagram illustrating an example of an autonomous vehicle according to one embodiment.

Referring now to FIG. 2, in one embodiment, sensor system 115 includes, but it is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the autonomous vehicle. IMU unit 213 may sense position and orientation changes of the autonomous vehicle based on inertial acceleration. Radar unit 214 may represent a system that utilizes radio signals to sense objects within the local environment of the autonomous vehicle. In some embodiments, in addition to sensing objects, radar unit 214 may additionally sense the speed and/or heading of the objects. LIDAR unit 215 may sense objects in the environment in which the autonomous vehicle is located using lasers. LIDAR unit 215 could include one or more laser sources, a laser scanner, and one or more detectors, among other system components. Cameras 211 may include one or more devices to capture images of the environment surrounding the autonomous vehicle. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the autonomous vehicle. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn control the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof.

Referring back to FIG. 1, wireless communication system 112 is to allow communication between autonomous vehicle 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyboard, a touch screen display device, a microphone, and a speaker, etc.

Some or all of the functions of autonomous vehicle 101 may be controlled or managed by perception and planning system 110, especially when operating in an autonomous driving mode. Perception and planning system 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, perception and planning system 110 may be integrated with vehicle control system 111.

For example, a user as a passenger may specify a starting location and a destination of a trip, for example, via a user interface. Perception and planning system 110 obtains the trip related data. For example, perception and planning system 110 may obtain location and route information from an MPOI server, which may be a part of servers 103-104. The location server provides location services and the MPOI server provides map services and the POIs of certain locations. Alternatively, such location and MPOI information may be cached locally in a persistent storage device of perception and planning system 110.

While autonomous vehicle 101 is moving along the route, perception and planning system 110 may also obtain real-time traffic information from a traffic information system or server (TIS). Note that servers 103-104 may be operated by a third party entity. Alternatively, the functionalities of servers 103-104 may be integrated with perception and planning system 110. Based on the real-time traffic information, MPOI information, and location information, as well as real-time local environment data detected or sensed by sensor system 115 (e.g., obstacles, objects, nearby vehicles), perception and planning system 110 can plan an optimal route and drive vehicle 101, for example, via control system 111, according to the planned route to reach the specified destination safely and efficiently.

Server 103 may be a data analytics system to perform data analytics services for a variety of clients. In one embodiment, data analytics system 103 includes data collector 121 and machine learning engine 122. Data collector 121 collects driving statistics 123 from a variety of vehicles, either autonomous vehicles or regular vehicles driven by human drivers. Driving statistics 123 include information indicating the driving commands (e.g., throttle, brake, steering commands) issued and responses of the vehicles (e.g., speeds, accelerations, decelerations, directions) captured by sensors of the vehicles at different points in time. Driving statistics 123 may further include information describing the driving environments at different points in time, such as, for example, routes (including starting and destination locations), MPOIs, road conditions, weather conditions, etc.

Based on driving statistics 123, machine learning engine 122 generates or trains a set of rules, algorithms, and/or predictive models 124 for a variety of purposes. In one embodiment, algorithms 124 may include perception and planning algorithms to drive an ADV. Algorithms 124 can then be uploaded on ADVs to be utilized during autonomous driving in real-time.

Figure 3A:
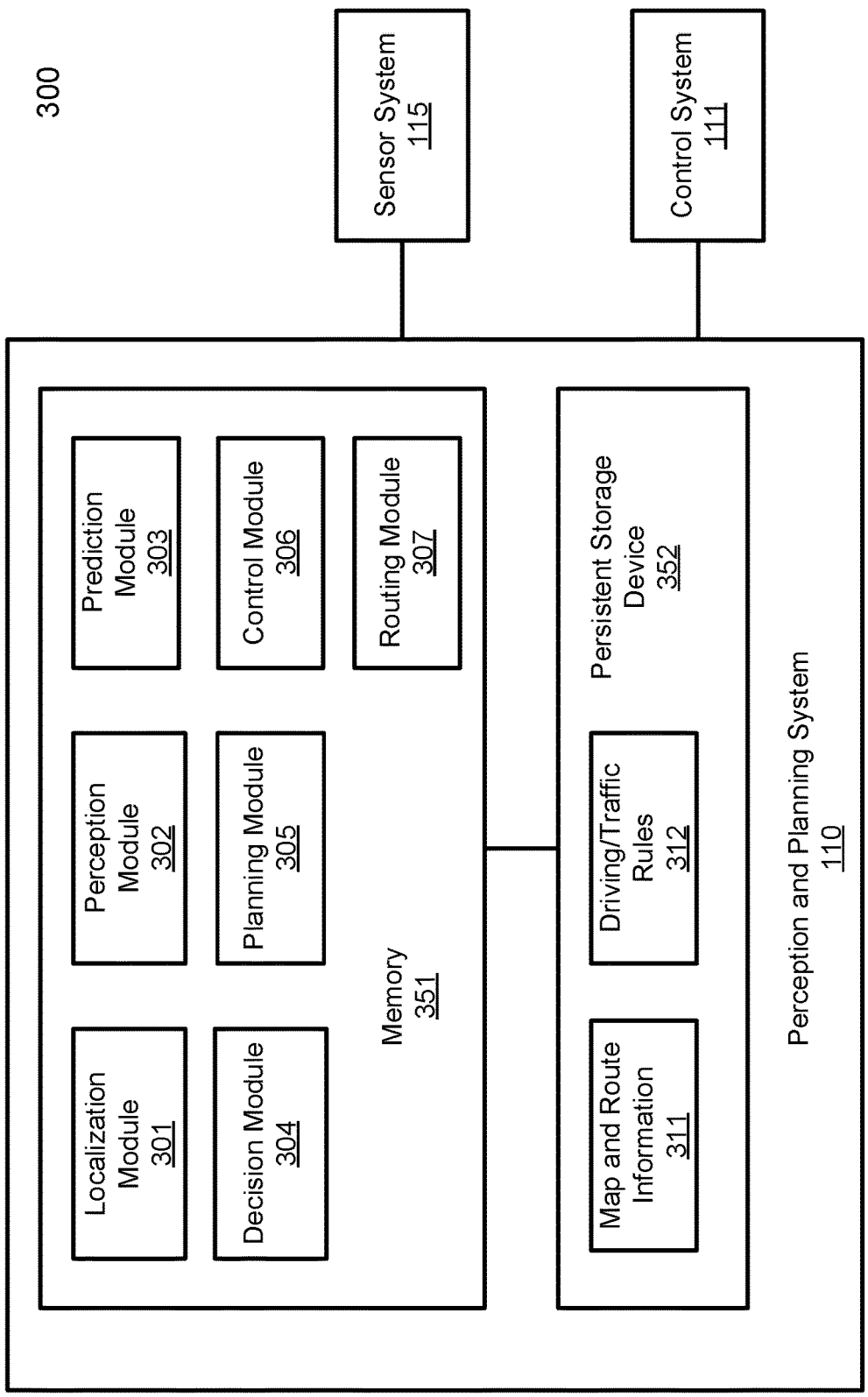
FIGS. 3A-3B are block diagrams illustrating an example of a perception and planning system used with an autonomous vehicle according to one embodiment.
Figure 3B:
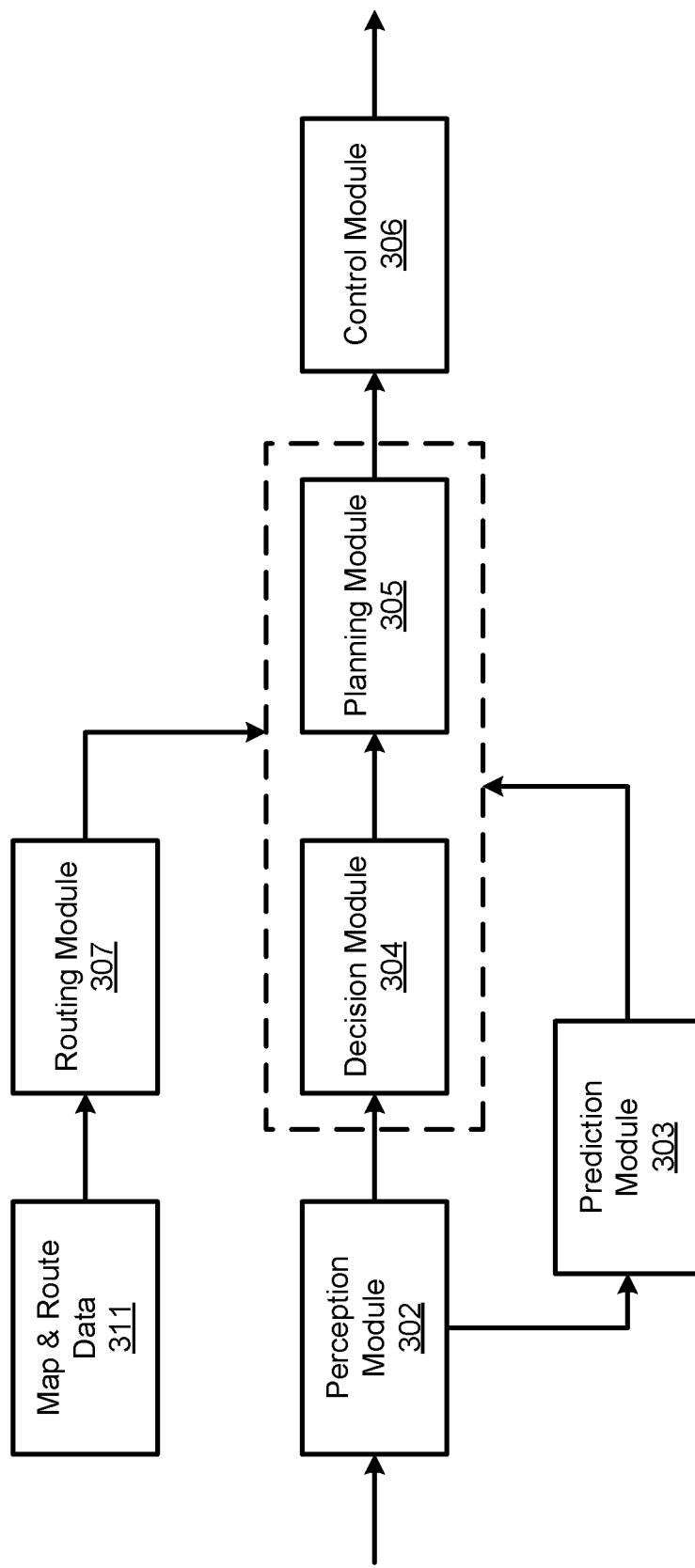

FIGS. 3A and 3B are block diagrams illustrating an example of a perception and planning system used with an autonomous vehicle according to one embodiment. System 300 may be implemented as a part of autonomous vehicle 101 of FIG. 1 including, but is not limited to, perception and planning system 110, control system 111, and sensor system 115. Referring to FIGS. 3A-3B, perception and planning system 110 includes, but is not limited to, localization module 301, perception module 302, prediction module 303, decision module 304, planning module 305, control module 306, and routing module 307.

Some or all of modules 301-307 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-307 may be integrated together as an integrated module. For example, prediction module 303, decision module 304, planning module 305, and/or control module 306 may be integrated into fewer modules or single module.

Localization module 301 determines a current location of autonomous vehicle 300 (e.g., leveraging GPS unit 212) and manages any data related to a trip or route of a user. Localization module 301 (also referred to as a map and route module) manages any data related to a trip or route of a user. A user may log in and specify a starting location and a destination of a trip, for example, via a user interface. Localization module 301 communicates with other components of autonomous vehicle 300, such as map and route information 311, to obtain the trip related data. For example, localization module 301 may obtain location and route information from a location server and a map and POI (MPOI) server. A location server provides location services and an MPOI server provides map services and the POIs of certain locations, which may be cached as part of map and route information 311. While autonomous vehicle 300 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration, traffic light signals, a relative position of another vehicle, a pedestrian, a building, crosswalk, or other traffic related signs (e.g., stop signs, yield signs), etc., for example, in a form of an object. The lane configuration includes information describing a lane or lanes, such as, for example, a shape of the lane (e.g., straight or curvature), a width of the lane, how many lanes in a road, one-way or two-way lane, merging or splitting lanes, exiting lane, etc.

Perception module 302 may include a computer vision system or functionalities of a computer vision system to process and analyze images captured by one or more cameras in order to identify objects and/or features in the environment of autonomous vehicle. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

For each of the objects, prediction module 303 predicts what the object will behave under the circumstances. The prediction is performed based on the perception data perceiving the driving environment at the point in time in view of a set of map/rout information 311 and traffic rules 312. For example, if the object is a vehicle at an opposing direction and the current driving environment includes an intersection, prediction module 303 will predict whether the vehicle will likely move straight forward or make a turn. If the perception data indicates that the intersection has no traffic light, prediction module 303 may predict that the vehicle may have to fully stop prior to enter the intersection. If the perception data indicates that the vehicle is currently at a left-turn only lane or a right-turn only lane, prediction module 303 may predict that the vehicle will more likely make a left turn or right turn respectively.

For each of the objects, decision module 304 makes a decision regarding how to handle the object. For example, for a particular object (e.g., another vehicle in a crossing route) as well as its metadata describing the object (e.g., a speed, direction, turning angle), decision module 304 decides how to encounter the object (e.g., overtake, yield, stop, pass). Decision module 304 may make such decisions according to a set of rules such as traffic rules or driving rules 312, which may be stored in persistent storage device 352.

Routing module 307 is configured to provide one or more routes or paths from a starting point to a destination point. For a given trip from a start location to a destination location, for example, received from a user, routing module 307 obtains route and map information 311 and determines all possible routes or paths from the starting location to reach the destination location. Routing module 307 may generate a reference line in a form of a topographic map for each of the routes it determines from the starting location to reach the destination location. A reference line refers to an ideal route or path without any interference from others such as other vehicles, obstacles, or traffic condition. That is, if there is no other vehicle, pedestrians, or obstacles on the road, an ADV should exactly or closely follows the reference line. The topographic maps are then provided to decision module 304 and/or planning module 305. Decision module 304 and/or planning module 305 examine all of the possible routes to select and modify one of the most optimal routes in view of other data provided by other modules such as traffic conditions from localization module 301, driving environment perceived by perception module 302, and traffic condition predicted by prediction module 303. The actual path or route for controlling the ADV may be close to or different from the reference line provided by routing module 307 dependent upon the specific driving environment at the point in time.

Based on a decision for each of the objects perceived, planning module 305 plans a path or route for the autonomous vehicle, as well as driving parameters (e.g., distance, speed, and/or turning angle), using a reference line provided by routing module 307 as a basis. That is, for a given object, decision module 304 decides what to do with the object, while planning module 305 determines how to do it. For example, for a given object, decision module 304 may decide to pass the object, while planning module 305 may determine whether to pass on the left side or right side of the object. Planning and control data is generated by planning module 305 including information describing how vehicle 300 would move in a next moving cycle (e.g., next route/path segment). For example, the planning and control data may instruct vehicle 300 to move 10 meters at a speed of 30 mile per hour (mph), then change to a right lane at the speed of 25 mph.

Based on the planning and control data, control module 306 controls and drives the autonomous vehicle, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, steering commands) at different points in time along the path or route.

In one embodiment, the planning phase is performed in a number of planning cycles, also referred to as driving cycles, such as, for example, in every time interval of 100 milliseconds (ms). For each of the planning cycles or driving cycles, one or more control commands will be issued based on the planning and control data. That is, for every 100 ms, planning module 305 plans a next route segment or path segment, for example, including a target position and the time required for the ADV to reach the target position. Alternatively, planning module 305 may further specify the specific speed, direction, and/or steering angle, etc. In one embodiment, planning module 305 plans a route segment or path segment for the next predetermined period of time such as 5 seconds. For each planning cycle, planning module 305 plans a target position for the current cycle (e.g., next 5 seconds) based on a target position planned in a previous cycle. Control module 306 then generates one or more control commands (e.g., throttle, brake, steering control commands) based on the planning and control data of the current cycle.

Note that decision module 304 and planning module 305 may be integrated as an integrated module. Decision module 304/planning module 305 may include a navigation system or functionalities of a navigation system to determine a driving path for the autonomous vehicle. For example, the navigation system may determine a series of speeds and directional headings to affect movement of the autonomous vehicle along a path that substantially avoids perceived obstacles while generally advancing the autonomous vehicle along a roadway-based path leading to an ultimate destination. The destination may be set according to user inputs via user interface system 113. The navigation system may update the driving path dynamically while the autonomous vehicle is in operation. The navigation system can incorporate data from a GPS system and one or more maps so as to determine the driving path for the autonomous vehicle.

Figure 4:
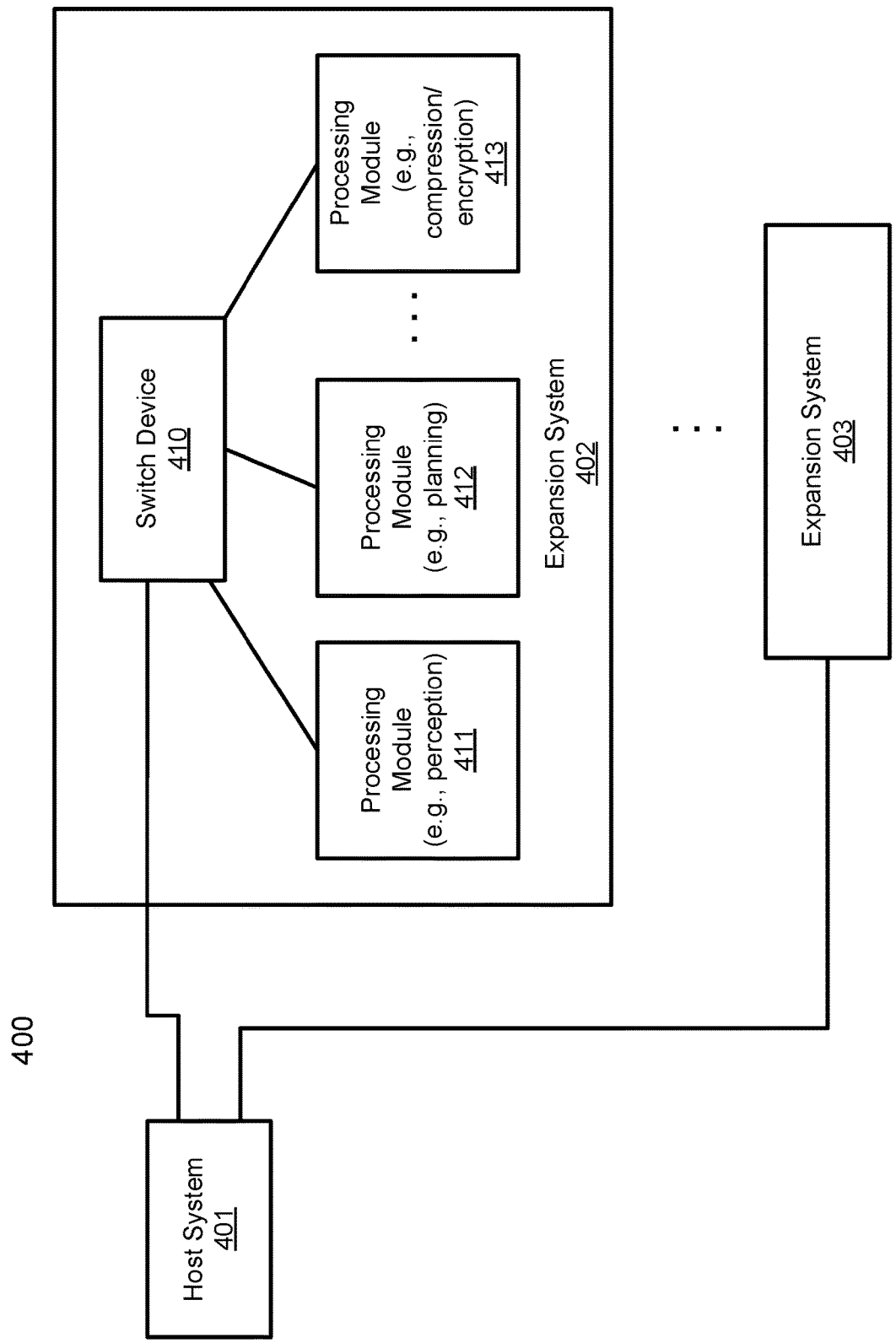
FIG. 4 is a block diagram illustrating an example of a data processing system according to one embodiment.

FIG. 4 is a block diagram illustrating an example of architecture of a data processing system according to one embodiment. System 400 may represent perception and planning system 110 of FIG. 1 or system 300 of FIG. 3. Referring to FIG. 4, system 400 includes a host system 401 coupled to one or more expansion systems or devices 402-403. The architecture of expansion systems 402-403 may be identical or similar. Host system 401 can be any kind of computers such as a client or a server. Host system 401 includes one or more processors and a memory storing executable instructions, which when executed by the processors, cause the processors to perform at least a portion of the autonomous driving operations as described above with respect to FIGS. 1-3. For example, host system 401 may host the components 301-307 executed therein.

One or more expansion systems 402-403 may be coupled to host system 401, for example, via a bus such as a peripheral component interface express (PCIe) bus. In one embodiment, each of the expansion systems (also referred to as expansion devices) 402-403 can be configured to offload at least a portion of the autonomous driving operations from modules 301-307 from host system 401. For the purpose of illustration, expansion device 402 will be described in details; however, the same description can also be applied to other expansion devices such as expansion device 403.

In one embodiment, expansion device 402 includes a switch device 410 and one or more processing modules 411-413 coupled to switch device 410. Each of the processing modules 411-413 may include a processor, a memory, and/or a local storage, which can execute one or more instructions to perform a set of dedicated operations such as data processing intense operations on behalf of host system 401 or another host node within expansion device 402. A processing module can also be a storage module having a storage device to store data. A processor may be a central processing unit (CPU), a general processing unit (GPU), a field programmable gate array (FPGA), a system on chip (SoC), a digital signal processor (DSP), a microcontroller (e.g., a storage controller), or an application specific integrated circuit (ASIC). These modules or processors can be implemented in a variety of form factors such as COM Express (COMe), PCIe, or mobile PCIe Module (MXM) form factors. These form factors allow users to stack together a variety of products from customized design or from commercial off-the shelf manufacturers to build expansion devices. A storage device of a storage module can be a solid state device (SSD) in U.2 or M.2 form factors, multimedia card (MMC) and secure digital (SD) cards, universal serial bus (USB) flash drives.

In one embodiment, the data processing operations that can be offloaded or accelerated may include, as described above, a perception process of perceiving a driving environment of an ADV, a prediction process of predicting a movement of an obstacle perceived (e.g., image processing, LIDAR point cloud processing), a decision process what the ADV should do, and a planning process of planning a trajectory to drive the ADV accordingly. Any of these operations can be distributed to one or more of the processing modules 411-413 for execution, in parallel, in series, or in a pipeline manner. For example, a perception process may be performed by a first processing module and the result may be routed to a second processing module that is configured to perform a prediction process, a decision process, and/or a planning process as shown in FIG. 3B. As described above, at least some of the processing modules 411-413 may be configured as a client node, a host node, or both, dependent upon the specific needs.

Figure 5A:
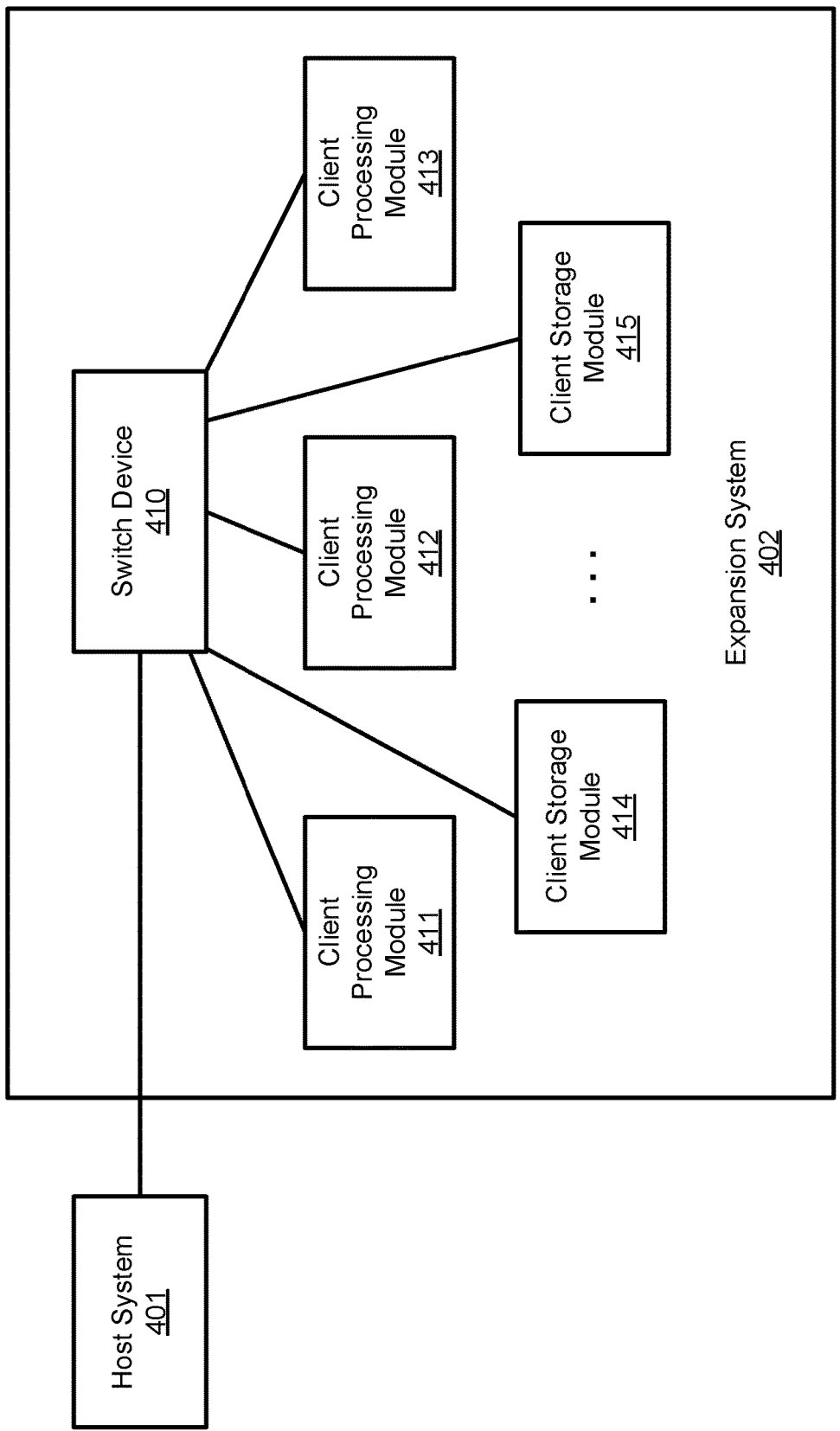
FIG. 5A is a block diagram illustrating an example of a data processing system according to one embodiment.

FIG. 5A is a block diagram illustrating an expansion device configured in a client device according to one embodiment. Referring to FIG. 5A, in this example, all processing modules 411-415 are configured as client devices to host system 401. Such a configuration can be performed during the initialization expansion device 402. Specifically, when host system 401 is coupled to expansion device 402 over a bus such as a PCIe bus, firmware of expansion device 402 responds to the bus enumeration initiated from host system 401. The firmware then configures the processing modules 411-415 are client devices or end point nodes with respect to host system 401 as a root node or root device, such that they can respond to the subsequent memory and IO cycles initiated from host system 401. Once processing modules 411-415 have been configured as client devices to host system 401, for example, PCI bus cycles, host system 401 can distribute the tasks, especially the computation intense tasks, to processing modules 411-415 The host system 401 can distribute the tasks by specifying a bus number and a device number of a specific client processing module of the expansion device 402. In response, switch device 410 routes the tasks to the target processing module. The results of the operations can then be transmitted back to host system 401. Host system 401 can also utilizes storage devices maintained by expansion device 402, for example, via storage modules 414-415.

Figure 5B:
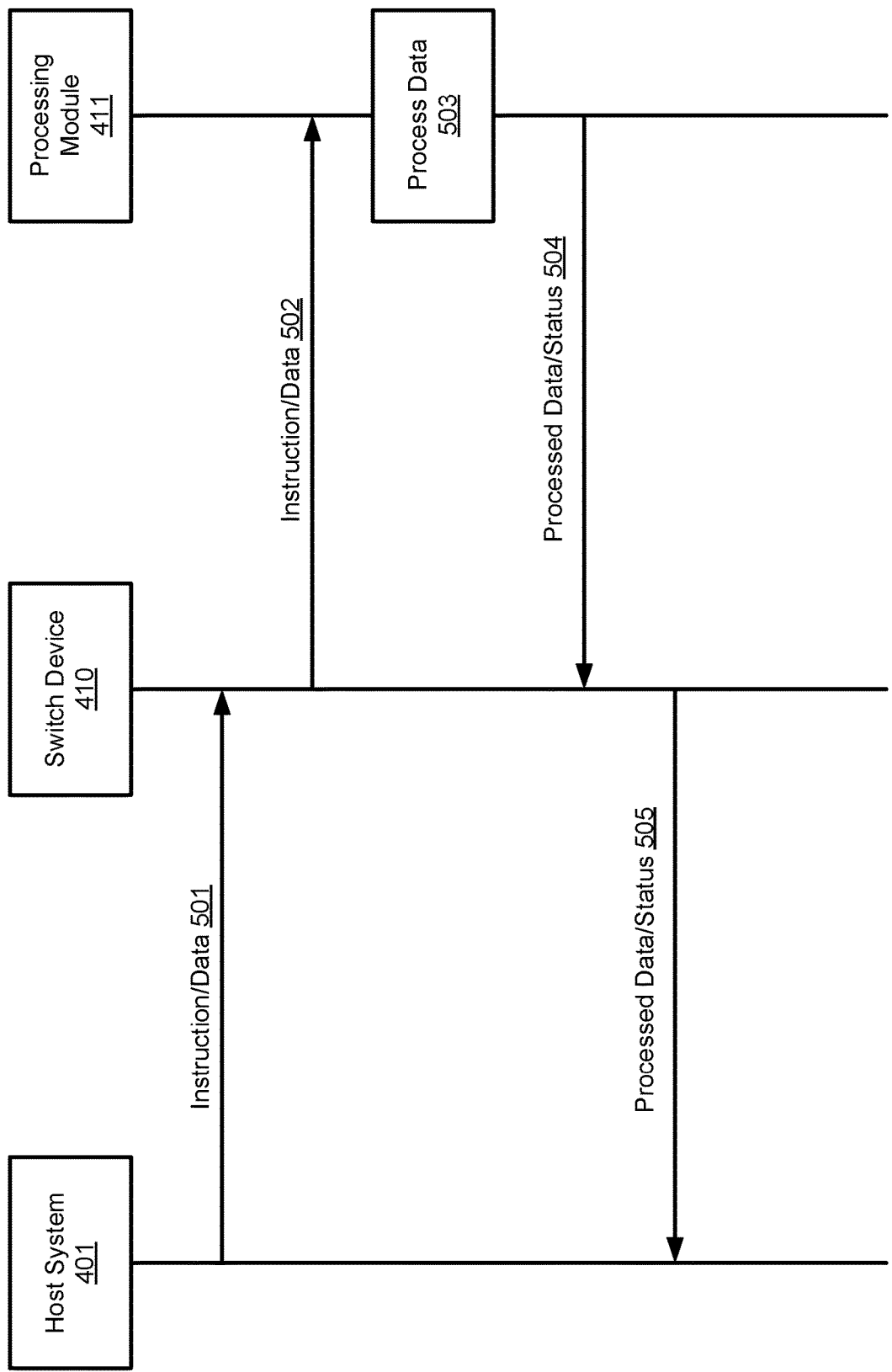
FIG. 5B is a processing diagram illustrating a process of processing data between a host system and an expansion device according to one embodiment.

FIG. 5B is a flow diagram illustrating transactions between a host system and an expansion device as a client device according to one embodiment. Referring to FIG. 5B, it is assumed that processing module 411 has been configured as a client device to host system 401. In operation 501, host system 401 sends a request for processing data to switch device 410. The request may include data to be processed, an instruction regarding how to process, and a target device identifier (ID) (in this example, bus/device numbers of client processing module 411). In response to the request, switch device 410 routes the request to the target, processing module 411 via operation 502. Processing module 411 then performs the necessary operations on the data in response to the instruction at block 503, generating a result of the operations. The result may simply be a return status or the processed data (e.g., compressed data, encrypted data). In operation 504, processing module 411 transmits the result back to switch device 410, which in turn routes the same result back to host system 401 via operation 505.

According to one embodiment, expansion device 402 may also be configured and boot up as a standalone system. For example, expansion device 402 may boot up as a standalone system in response to determining that host system 401 is not coupled to expansion device 402. In such a configuration, at least one of the processing modules 411-415 is configured as a host device (e.g., root complex), while the remaining processing modules are configured as client devices (e.g., end points). When expansion device 402 boots up as a standalone system, variety of operations concerning the expansion device can be performed, such as, for example, internal testing operations. In another embodiment, multiple processing modules may be configured as host nodes, each representing a separate standalone system within the expansion device 402.

Figure 6:
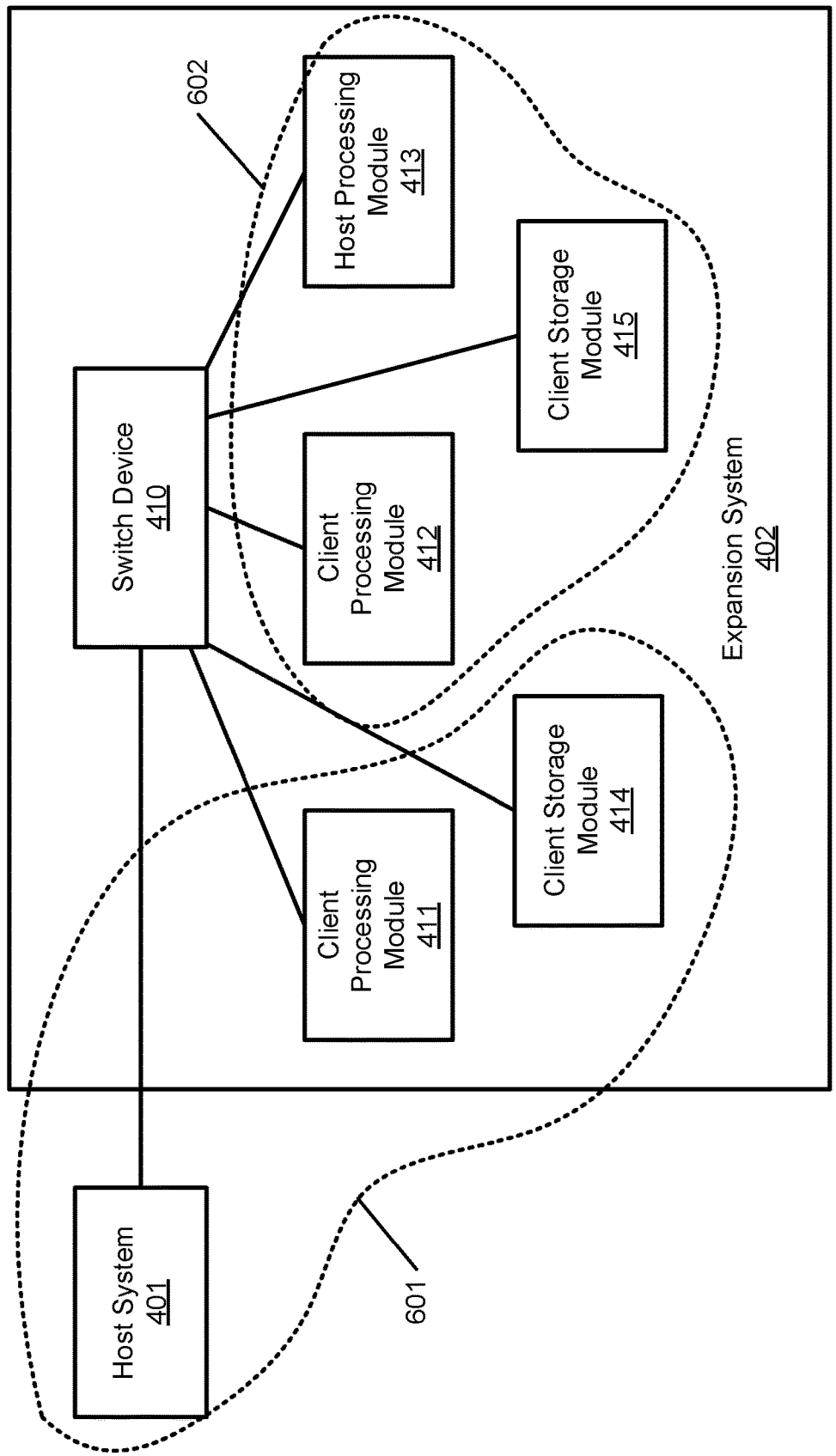
FIG. 6 is a block diagram illustrating an example of a data processing system according to one embodiment.

According to another embodiment, expansion device 402 can be configured in a hybrid mode, in which a first portion of the processing modules 411-415 can be configured as client devices to host system 401, while a second portion of the processing modules 411-415 may be configured as a standalone system as a peer system with respect to host system 401, as shown in FIG. 6. Referring to FIG. 6, in this example, processing module 413 has been configured as a host node, while processing modules 411-412 and 414-415 are configured as client devices. In this example, processing modules 411 and 414 are client devices to host system 401, forming system 601. Processing modules 412 and 415 are client devices to processing module 413 as a host node, forming system 602. Systems 601 and 602 are peer systems that operate in parallel or independently. Host node 413 may communicate with external host system 401 via a host-to-host connection.

According to a further embodiment, a processing module can be configured as a host node and a client node. For example, a processing module can be configured as a client device to an external host system, and the same processing module is also configured as a host node to another processing module that has been configured as a client node.

Figure 7A:
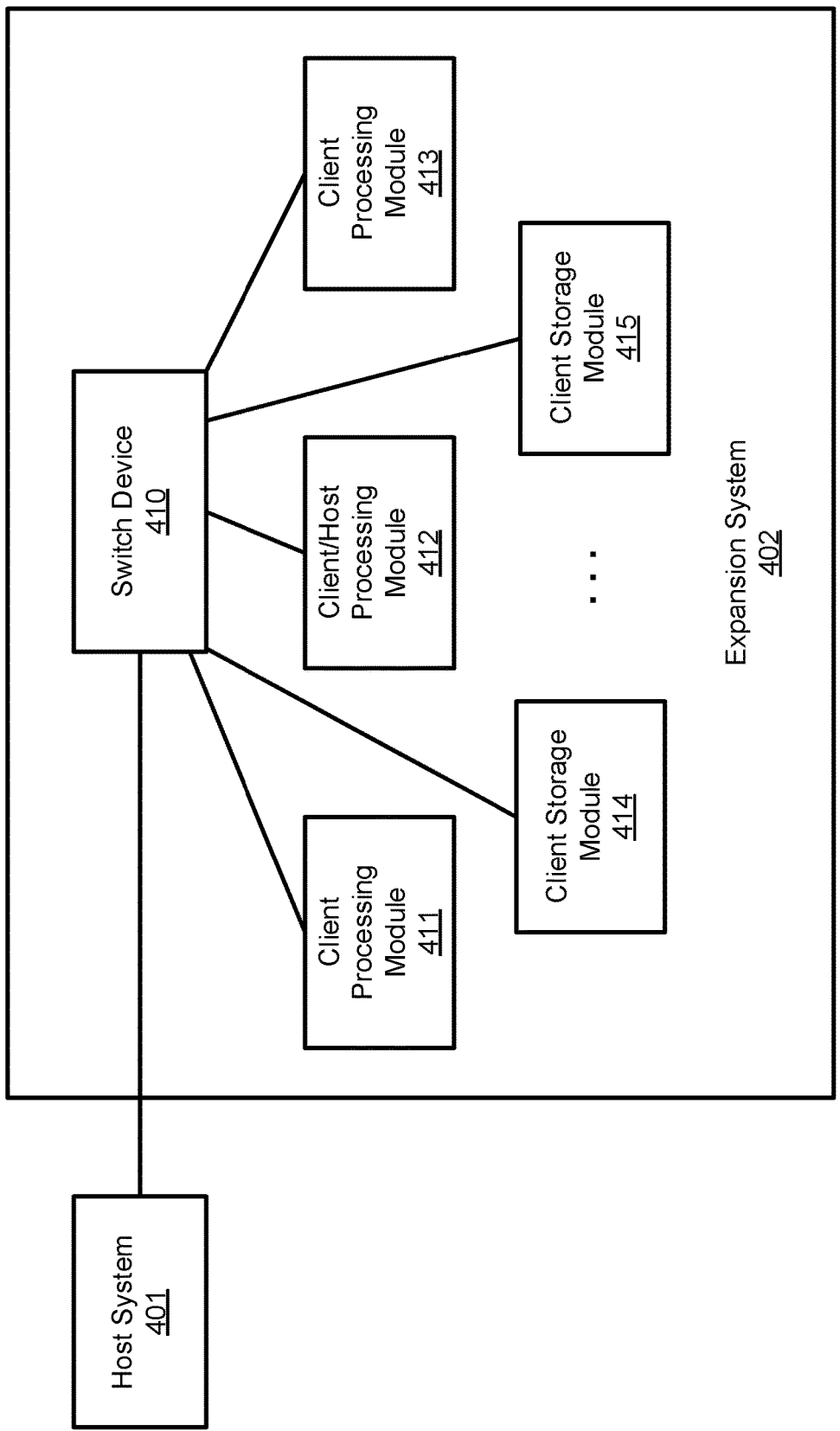
FIGS. 7A and 7B are block diagrams illustrating an example of a data processing system according to one embodiment.

FIG. 7A is a block diagram illustrating an example of system configuration of a data processing system according to one embodiment. Referring to FIG. 7A, in this example, processing module 412 has been configured as both a client node and a host node. In one embodiment, processing module 412 is configured as a client node to external host system 401. In addition, processing module 412 is also configured as a host node with respect to other client nodes within expansion device 402. As a client node, processing module 412 may receive instructions and data from host system 401 and perform a data processing operation on the data in response to the instructions. In addition, processing module 412 may distribute a task to its client node such as processing module 415. For example, the data received from host system 401 may be data of a data log captured and recorded during autonomous driving, which captures the driving statistics of an ADV (e.g., commands issued and responses of the vehicle at different points in time). The data is processed by processing module 412 (as a client node to host system 401) such as data compression and/or encryption. The processed data is then transmitted from processing module 412 (as a host node) to processing module 415 as a storage module (as a client node) to be stored in a storage device.

Figure 7B:
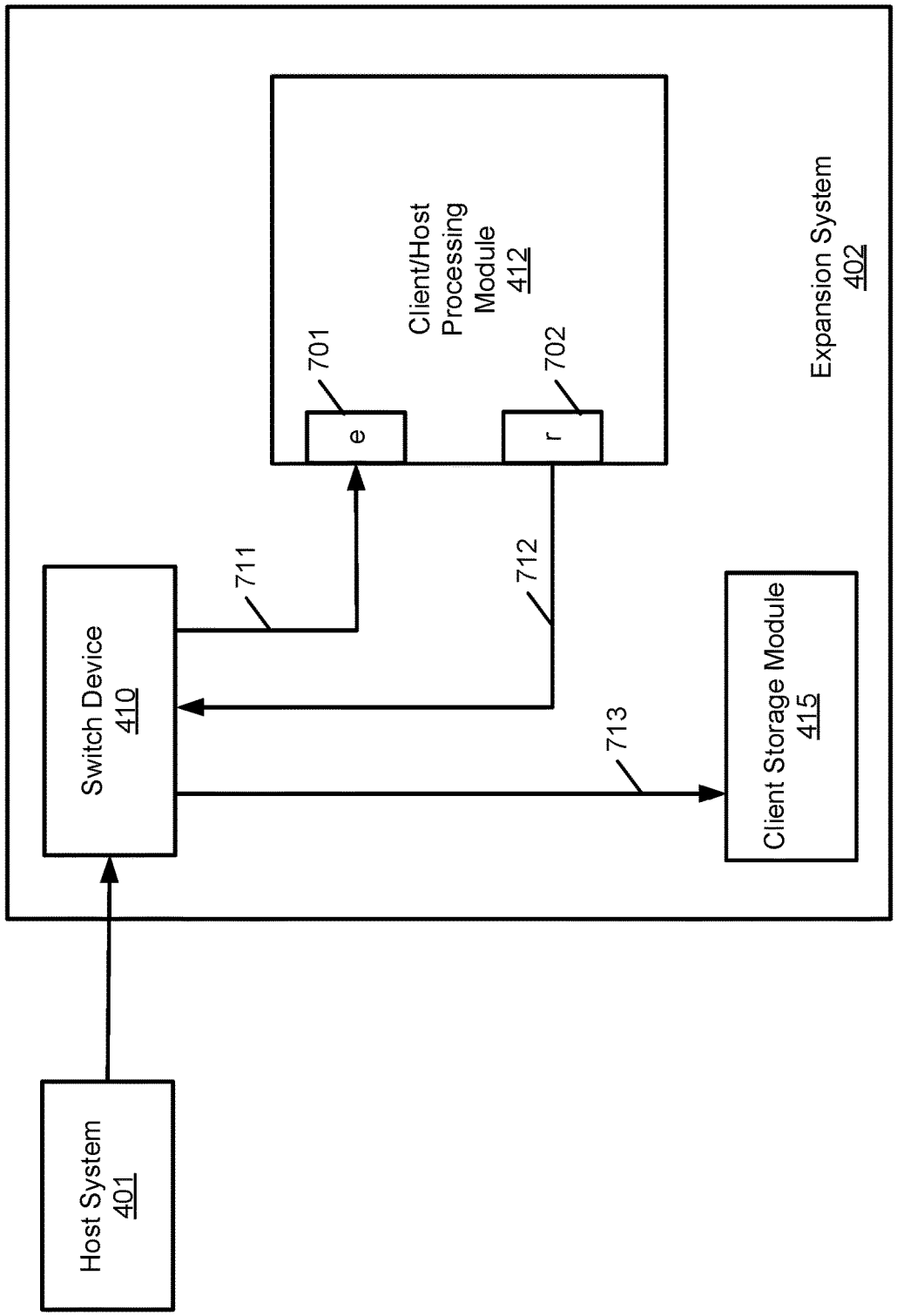

FIG. 7B shows an example of a specific configuration of the system as shown in FIG. 7A. Referring to FIG. 7B, in one embodiment, processing module 412 includes an endpoint port 701 and a root port 702 coupled to switch device 410. When host system 401 sends data to its client device in expansion device 402, i.e., processing module 412. Processing module 412 receives the data through path 711 from its endpoint port 701. Processing module 412 can then process the data such as data compression or data encryption. Processing module 412 then transmits the processed data to its client node, i.e., processing node 415, via path 712 from its root port 702 and the corresponding uplink to switch device 410. Switch device 410 then routes the processed data to processing module 415 via path 713. Alternatively, according to an alternative embodiment, processing module 412 may transmit the processed data to processing module 415 via a peer-to-peer connection, such as, a peer-to-peer DMA transaction.

Figure 8:
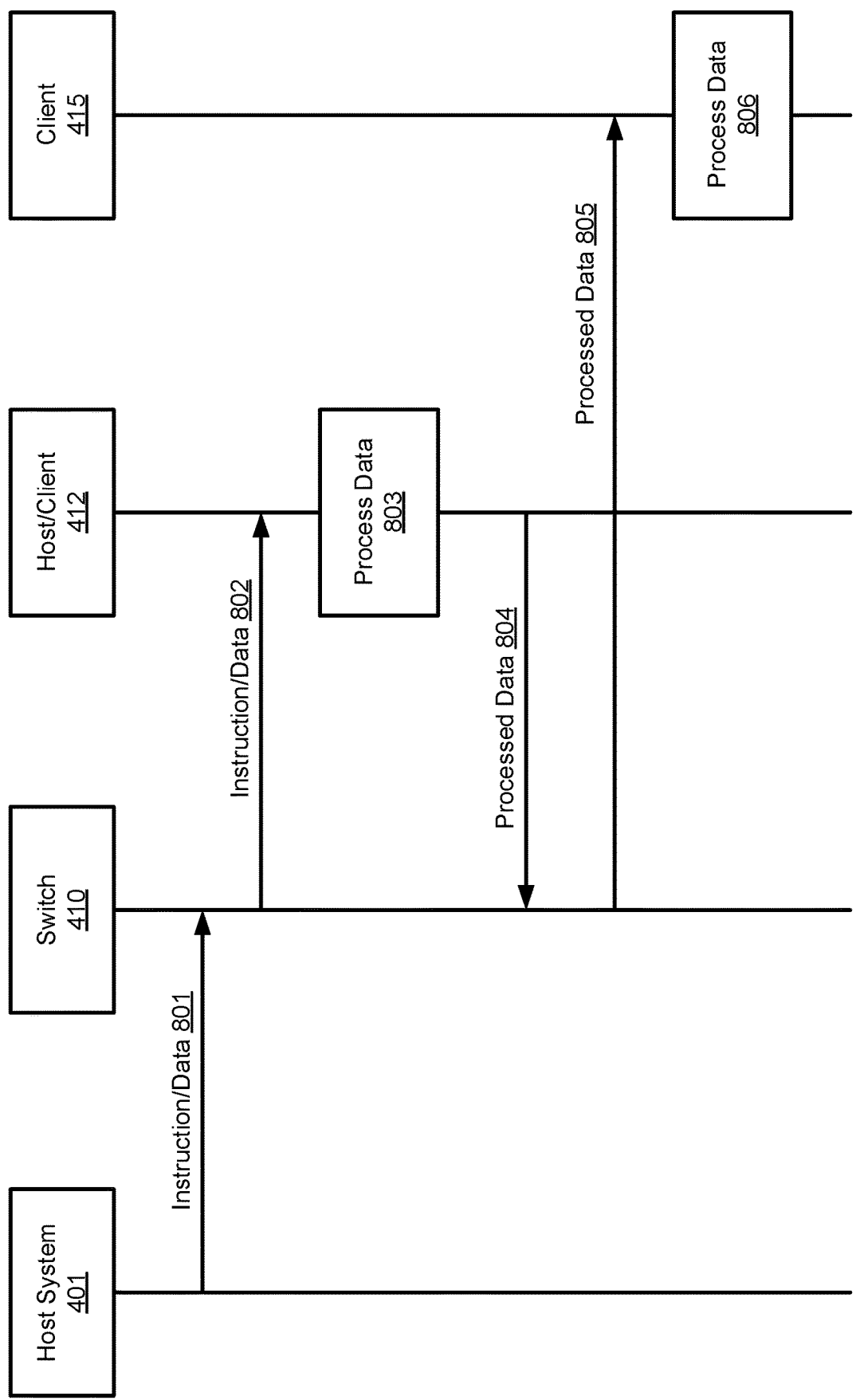
FIG. 8 is a processing diagram illustrating a process of processing data between a host system and an expansion device according to one embodiment.

FIG. 8 is a flow diagram illustrating a process of routing data between a host system and an expansion device according to one embodiment. Referring to FIG. 8, in operation 801, host system 401 transmits instructions and data to switch device 410 of expansion device 402. Switch device 410 reroutes the data via operation 802 to processing module 412, which is configured as a host/client node. In operation 803, processing module 412 performs a data processing operation on the data such as data compression or encryption. In operation 804, processing module 412 transmits the processed data to switch device 410, which in turn reroutes the processed data to processing module 415 via operation 805, where processing module 415 has been configured as a client device to processing module 412. In operation 806, processing module 415 performs another data processing operation on the data (e.g., storing the data in a persistent storage device).

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A data processing system utilized in autonomous driving, the system comprising:
    a host system having one or more host processors and a memory storing instructions, which when executed by the host processors, cause to host processors to perform autonomous driving operationsto drive an autonomous driving vehicle (ADV); and
    an expansion device that comprises
        a peripheral component express (PCIe) compatible switch device, and
        a plurality of processing modules coupled to the switch device, wherein in response to firmware of the expansion device detecting that the host system is coupled to the expansion device over a PCIe bus, the firmware of the expansion device configures at least one of the plurality of processing modules as a client device to the host system, such that the host system can offload at least one of the autonomous driving operations to the at least one of the plurality of processing modules; and
        wherein in response to the firmware of the expansion device detecting that the host system is not coupled to the host system over the PCIe bus, the firmware of the expansion device configures a first of the processing modules as a host node within the expansion device and configures remaining ones of the processing modules as client nodes to the first processing module such that the expansion device operates as a standalone system ora peer to the host system.

2. The system of claim 1, wherein detection that the host system is coupled to the expansion device is performed during an initialization of the expansion device.

3. The system of claim 2, wherein the firmware is configured to respond to a bus enumeration process during an initialization of the host system and to configure one or more control registers of the at least one processing module, such that the at least one processing module appears as a client device to the host system.

4. The system of claim 1, wherein detection that the host system is not coupled to the expansion device is performed during an initialization of the expansion device.

5. The system of claim 4, wherein the expansion device is configured as the standalone system such that the first processing module is configured to distribute tasks to the remaining processing modules to be performed by the remaining processing modules.

6. The system of claim 1, wherein a first set of one or more processing modules configured as client nodes to the host system, and wherein a second set of one or more processing modules configured as client nodes to the first processing module.

7. The system of claim 6, wherein the host system and the first set of processing modules operate as a first processing system, and wherein the first processing module and the second set of processing modules operate as a second processing system in parallel to the first processing system.

8. The system of claim 6, wherein the first processing module is further configured as a first client node to the host system, wherein in response to a request received from the host system via the switch device, the first processing module performs a first operation and transmits a result of the first operation to a second processing module via the switch device, and wherein the second processing module performs a second operation.

9. The system of claim 8, wherein the second processing module is configured as a client node to the first processing module.

10. The system of claim 1, wherein the plurality of processing modules comprises the first processing module and a second processing module configured as client nodes to the host system, wherein in response to data received from the host system via the switch device, the first processing module is configured to perform a first data processing operation on the data and to transfer the processed data to the second processing module via a peer-to-peer transfer, and wherein the second processing module performs a second data processing operation on the processed data.

11. The system of claim 10, wherein the first processing module performs a data compression or encryption on data received from the host system, and wherein the second processing module is a storage module to store the data processed by the first processing module in a persistent storage device.

12. The system of claim 1, wherein at least one of the processing modules comprises a central processing unit (CPU), a general processing unit (GPU), a field programmable gate array (FPGA), or a system on a chip (SoC).

13. An expansion device utilized in autonomous driving, the device comprising:
    a host interface to be coupled to a host system, the host system having one or more host processors and a memory storing instructions, which when executed by the host processors, cause to the host processors to perform autonomous driving operations to drive an autonomous driving vehicle (ADV)
    a switch device coupled to the host interface, and
    a plurality of processing modules coupled to the switch device, wherein in response to firmware of the expansion device detecting that the host system is coupled to the expansion device, the firmware of the expansion device configures at least one of the plurality of processing modules as a client device to the host system, such that the host system can offload at least one of the autonomous driving operations to the at least one of the processing modules, and wherein in response to the firmware of the expansion device detecting that the host system is not coupled to the host system, the firmware of the expansion device configures a first of the processing modules as a host node within the expansion device and configures remaining ones of the processing modules as client nodes to the first processing module such that the expansion device operates as a standalone system or a peer to the host system.

14. The device of claim 13, wherein detection that the host system is coupled to the expansion device is performed during an initialization of the expansion device.

15. The device of claim 14, wherein the firmware is configured to respond to a bus enumeration process during an initialization of the host system and to configure one or more control registers of the at least one processing module, such that the at least one processing module appears as a client device to the host system.

16. The device of claim 13, wherein detection that the host system is not coupled to the expansion device is performed during an initialization of the expansion device.

17. The device of claim 16, wherein the expansion device is configured as the standalone system such that the first processing module is configured to distribute tasks to the remaining processing modules to be performed by the remaining processing modules.

18. The device of claim 13, wherein a first set of one or more processing modules configured as client nodes to the host system, and wherein a second set of one or more processing modules configured as client nodes to the first processing module.

19. The device of claim 18, wherein the host system and the first set of processing modules operate as a first processing system, and wherein the first processing module and the second set of processing modules operate as a second processing system in parallel to the first processing system.

20. The device of claim 18, wherein the first processing module is further configured as a first client node to the host system, wherein in response to a request received from the host system via the switch device, the first processing module performs a first operation and transmits a result of the first operation to a second processing module via the switch device, and wherein the second processing module performs a second operation.

* * * * *